(12) United States Patent
Bardot et al.

(10) Patent No.: US 10,618,550 B2
(45) Date of Patent: Apr. 14, 2020

(54) POWER STEERING ELECTROHYDRAULIC SYSTEM AND ELECTRIC VEHICLE FITTED WITH SUCH A SYSTEM

(71) Applicant: BLUEBUS, Ergue Gaberic (FR)

(72) Inventors: Christophe Bardot, Montigny le Bretonneux (FR); Alain Rochais, Plaisir (FR)

(73) Assignee: BLUEBUS, Ergue Gaberic (FR)

( * ) Notice: Subject to any disclaimer, the term of this patent is extended or adjusted under 35 U.S.C. 154(b) by 0 days.

(21) Appl. No.: 15/567,517

(22) PCT Filed: Nov. 9, 2016

(86) PCT No.: PCT/EP2016/077097
§ 371 (c)(1),
(2) Date: Oct. 18, 2017

(87) PCT Pub. No.: WO2017/084927
PCT Pub. Date: May 26, 2017

(65) Prior Publication Data
US 2018/0244309 A1      Aug. 30, 2018

(30) Foreign Application Priority Data
Nov. 16, 2015    (FR) .................................... 15 60965

(51) Int. Cl.
*B62D 5/065*      (2006.01)
*B62D 5/06*       (2006.01)
(Continued)

(52) U.S. Cl.
CPC ............ *B62D 5/065* (2013.01); *B60R 16/033* (2013.01); *B62D 5/064* (2013.01); *B62D 5/22* (2013.01); *B62D 6/02* (2013.01); *B60Y 2200/143* (2013.01)

(58) Field of Classification Search
CPC . B60R 16/033; B60Y 2200/143; B62D 5/065; B62D 6/02; B62D 5/22; B62D 5/064
(Continued)

(56) References Cited

U.S. PATENT DOCUMENTS 3,730,288 A    5/1973  Dean
3,938,331 A    2/1976  Polacek et al.
(Continued)

FOREIGN PATENT DOCUMENTS

| JP | H0995251 | 4/1997 |
| JP | 2003314440 | 11/2003 |
| JP | 2013184585 | 9/2013 |

OTHER PUBLICATIONS

French Search Report from French Patent Application No. 1560965, dated Jul. 29, 2016.
(Continued)

*Primary Examiner* — Kevin Hurley
*Assistant Examiner* — Felicia L. Brittman
(74) *Attorney, Agent, or Firm* — Greer, Burns & Crain Ltd.

(57) ABSTRACT

A power steering electrohydraulic system is provided for an electric vehicle, including: at least one reservoir of hydraulic fluid; and at least one hydraulic actuator for actuating a steering rack shaft of the vehicle; at least two electric motor pump units in parallel for supplying the actuator with hydraulic fluid from the reservoir and adjusting the flow rate of the hydraulic fluid supplied to the actuator, and each electric motor pump unit is a motor pump unit operating at a voltage of 24V. A vehicle equipped with such a system is also provided.

11 Claims, 2 Drawing Sheets

(51) Int. Cl.
*B60R 16/033* (2006.01)
*B62D 5/22* (2006.01)
*B62D 6/02* (2006.01)

(58) Field of Classification Search
USPC ........................................................ 180/422
See application file for complete search history.

(56) References Cited

U.S. PATENT DOCUMENTS

2005/0217260 A1* 10/2005 Desjardins .............. F16D 31/02
    60/421
2011/0056755 A1    3/2011 Futahashi et al.
2014/0257638 A1*  9/2014 Yamada ................. B62D 5/065
    701/41
2017/0137023 A1*  5/2017 Anderson .......... B60G 17/0195

OTHER PUBLICATIONS

International Search Report from International Patent Application No. PCT/EP2016/077097, dated Feb. 17, 2017.
Written Opinion from International Patent Application No. PCT/EP2016/077097, dated Feb. 17, 2017.

* cited by examiner

POWER STEERING ELECTROHYDRAULIC SYSTEM AND ELECTRIC VEHICLE FITTED WITH SUCH A SYSTEM

BACKGROUND

The present invention relates to an electro-hydraulic power-assisted steering system for vehicles, in particular for electric vehicles. It also relates to an electric vehicle, in particular an electric public transport land vehicle, of the bus or tyred tram type, fitted with such a system.

The field of the invention is the field of electric public transport land vehicles of the bus or tyred tram type, fitted with rechargeable electrical energy storage modules in order to supply at least one electric motor of said electric vehicle.

Today, most electric vehicles are equipped with a system for assisting the steering of the vehicle, commonly called "power-assisted steering". This becomes indispensable in the context of heavy vehicles, such as public transport vehicles of the bus type.

In current vehicles, and in particular in electric public transport vehicles, the vehicle's power-assisted steering is provided by an electro-hydraulic system comprising a hydraulic fluid reservoir, a hydraulic actuator for operating a steering rack shaft of the vehicle, and an electric pump-motor pumping the hydraulic fluid to the actuator according to the driver's requirements. The electric pump-motor is supplied by a high-voltage signal of the order of 230 Volts.

Now, using a high-voltage pump-motor operating at 230V is hazardous, due to the voltage used.

In addition, in electric vehicles, this requires voltage conversion in order to obtain the 230V supply voltage from the high-voltage signal delivered by the batteries of the vehicle (generally 400V), which requires the use of a specific voltage converter which is a costly element with a large space requirement.

Moreover, when the electric pump-motor fails, the power-assisted steering is completely lost, which on the one hand is not very ergonomic and on the other hand can be hazardous for the people on board the vehicle.

A purpose of the invention is to overcome these drawbacks.

Another purpose of the invention is to propose a safer power-assisted steering system for an electric vehicle.

Another purpose of the invention is to propose a power-assisted steering system for an electric vehicle which is more cost-effective and simpler to incorporate into an electric vehicle.

A further purpose of the invention is to propose a power-assisted steering system for an electric vehicle offering improved failure management.

Yet another purpose of the invention is to propose a power-assisted steering system for a heavy vehicle, of the passenger bus type, which does not require a dedicated power converter, i.e. in addition to a converter with which the vehicle is already equipped.

SUMMARY

The invention proposes an electro-hydraulic power-assisted steering system for a heavy electric vehicle, comprising:
- at least one hydraulic fluid reservoir,
- at least one hydraulic actuator for actuating a steering rack shaft of said vehicle; and
- at least one electric pump-motor in order to supply the hydraulic actuator with hydraulic fluid from the hydraulic fluid reservoir and adjust the flow rate of hydraulic fluid provided to said hydraulic actuator.

In the present application, the expression "heavy vehicle" denotes a road vehicle of more than 3.5 tonnes gross vehicle weight rating (GVWR).

In addition, the expression "high voltage" denotes a direct current voltage greater than or equal to 60V. According to current standards, such a voltage is called "hazardous voltage".

Moreover, the expression "low voltage" denotes a direct current voltage less than or equal to 50V.

Furthermore, the expression "tyred tram" denotes an electric public transport land vehicle mounted on wheels and which is recharged at each station, so that there is no need for heavy infrastructure of the rails or catenaries type on the public road network. Such an electric vehicle is recharged at each station by means of charging elements of the station and a connector connecting said vehicle to said station.

According to a particularly advantageous characteristic, the system according to the invention can comprise at least two electric pump-motor arranged in parallel in order to supply the hydraulic actuator with hydraulic fluid from the hydraulic fluid reservoir and adjusting the flow rate of hydraulic fluid provided to said hydraulic actuator.

Thus, the invention proposes a power-assistance system utilizing several electric pump-motors placed in parallel, supplying at least one actuator, for one and the same steering rack shaft. As a result, it is possible to use pump-motors operating at a lower, and therefore less hazardous, voltage.

In addition, as the pump-motors used are able to operate at a lower voltage, it is possible to use a low-voltage electrical signal already present in the vehicle, such as a 24V signal, for example. This makes it possible to avoid using a dedicated converter in order to supply an electrical signal for the power-assisted steering system only. Incorporating the system into the electric vehicle is therefore simplified and less costly.

Furthermore, the power-assisted steering system according to the invention allows better failure management, because when one of the electric pump-motors fails, at least one other electric pump-motor continues to supply the system, which makes it possible to retain a part of the power-assisted steering, which is more ergonomic for the driver and less hazardous for the people on board the vehicle. In addition, this allows better performance of the system, as failure management is performed by the electric pump-motors. In other words, in the event of failure, the performance of the system is degraded, but still highly acceptable with respect to the existing systems of the state of the art.

According to a particularly advantageous characteristic, the system according to the invention can comprise one or more pump-motors.

The pump-motor, or at least one pump-motor, can be controlled in order to adjust its rotational speed, depending on any combination of the following parameters:
- a speed of turning of a steering wheel of said vehicle,
- a speed of said vehicle, and/or
- a weight of said vehicle.

The value of each of these parameters can be measured or provided by another device with which the vehicle is equipped, such as for example a steering angle sensor on the steering wheel, an odometer, vehicle weight indicators, etc.

Advantageously, the pump-motor, or at least one pump-motor, can be controlled in order to increase or reduce its rotational speed respectively, when the value of at least one parameter increases or reduces respectively.

Thus, it is possible to adjust the flow rate provided to the hydraulic actuator, depending on at least one of these parameters. Such a system allows for more effective steering assistance, while optimizing the operating range of the electric vehicle and while reducing the noise pollution created.

In fact, when the speed of turning of the steering wheel, the speed of the vehicle or the weight of the vehicle respectively, reduces (or is low) the or each pump-motor can be controlled in order to reduce the flow rate of hydraulic fluid provided to the hydraulic actuator, which makes it possible to reduce the electricity consumption of the system according to the invention, as well as its noise level. In this case, the, or each, pump-motor can be controlled in order to reduce its operating speed, and as a result its consumption and its noise level.

When the speed of turning of the steering wheel, the speed of the vehicle or the weight of the vehicle respectively increases, the, or each, pump-motor can be controlled in order to increase the flow rate of hydraulic fluid provided to the hydraulic actuator. In this case, the, or each, pump-motor can be controlled in order to increase its operating speed, and as a result its consumption and its noise level.

In a particular version, the system according to the invention can comprise exactly two pump-motors placed in parallel.

Advantageously, the, or each, electric pump-motor of the system according to the invention can be a pump-motor operating at a voltage of 24V, and more generally at low voltage.

Moreover, the system according to the invention can comprise a computer in order to control the, or each, electric pump-motor, depending on at least one parameter relating to the vehicle, such as those listed above.

Preferably, the rotational speed of the pump-motor is controlled by the computer, with a view to adjusting the flow rate of hydraulic fluid provided to the hydraulic actuator.

According to an embodiment, the system according to the invention can comprise a computer that is common to at least two pump-motors.

Alternatively or in addition, the system according to the invention can comprise an individual computer for at least one, in particular each, pump-motor.

The, or each, computer can send a control signal for each pump-motor. Each signal sent to a pump-motor can comprise a set value for a rotational speed that said pump-motor must reach, in order to reach a flow rate value for hydraulic fluid provided to said at least one actuator.

Advantageously, at least one computer can comprise at least one communication interface allowing it to receive at least one signal from a device external to said system.

For example, the communication interface can be a communication interface of the CAN type.

In addition, the external device can be a main computer of the vehicle.

Advantageously the computer, or at least one computer, can be configured in order to control the, or each, electric pump-motor, depending on at least one of the following parameters:
 a speed of turning of a steering wheel of the vehicle,
 a speed of the vehicle, and/or
 a weight of the vehicle;
the value(s) of which is(are) measured or provided by another device with which the vehicle is equipped.

The, or these, parameter(s) can be used in a predetermined relationship taking into account this (these) parameter(s) and deducing a control signal for each pump-motor therefrom.

The communication interface can be used in order to receive at least one signal representative of at least one of these parameters measured or provided by another device with which the vehicle is directly equipped, or via the main computer.

In an advantageous version, the system according to the invention can also comprise a low-voltage battery in order to supply the or each electric pump-motor.

According to another aspect of the invention, a heavy electric vehicle is proposed, equipped with an electro-hydraulic power-assisted steering system according to the invention.

Advantageously, the electro-hydraulic power-assisted steering system can be positioned in the front part, in particular near to a front axle of said vehicle, and even more particularly beneath a driver's position of said vehicle.

Thus, the hydraulic circuit between the reservoir and the steering rack shaft is shortened, which makes it possible to reduce the cost, complexity and hydraulic and electrical losses, and to facilitate the installation of the system in the vehicle.

The vehicle according to the invention can comprise:
 at least one rechargeable electrical energy storage module, delivering a high voltage electrical signal; and
 a power converter for providing a low-voltage electrical signal from said high voltage signal in order to supply the electro-hydraulic power-assisted steering system.

The low-voltage signal provided by such a power converter can be used by at least one other device/system with which the vehicle is equipped. Such a converter can for example supply a low-voltage circuit with which the vehicle is equipped.

Such a power converter can provide a 24V electrical signal.

According to a preferred, but in no way limitative, embodiment, the vehicle according to the invention can be a bus, a coach or an electric tyred tram.

The vehicle according to the invention can comprise one or more, in particular four, electrical energy storage modules arranged in the rear part of the vehicle.

Alternatively or in addition, the vehicle according to the invention can comprise one or more, in particular four, electrical energy storage module arranged in an upper wall of said vehicle.

The electrical energy storage modules can be used in parallel or in series.

Each energy storage module can be rechargeable from an external power supply.

Each electrical energy storage module can comprise one or more batteries, in particular LMP® (lithium metal polymer) or one or more supercapacitor(s).

BRIEF DESCRIPTION OF THE DRAWINGS

Other advantages and characteristics of the invention will become apparent on examination of the detailed description of an embodiment which is in no way limitative, and the attached drawings, in which.

DETAILED DESCRIPTION

It is well understood that the embodiments which will be described below are in no way limitative. In particular, variants of the invention can be envisaged that comprise only a selection of the characteristics described below in isolation from the other characteristics described, if this selection of characteristics is sufficient to confer a technical advantage or to differentiate the invention from the state of the prior art. This selection comprises at least one preferably functional characteristic without structural details, or with only a part of the structural details if this part alone is sufficient to confer a technical advantage or to distinguish the invention from the state of the prior art.

In the figures, elements common to several figures retain the same reference number.

Figure 1:
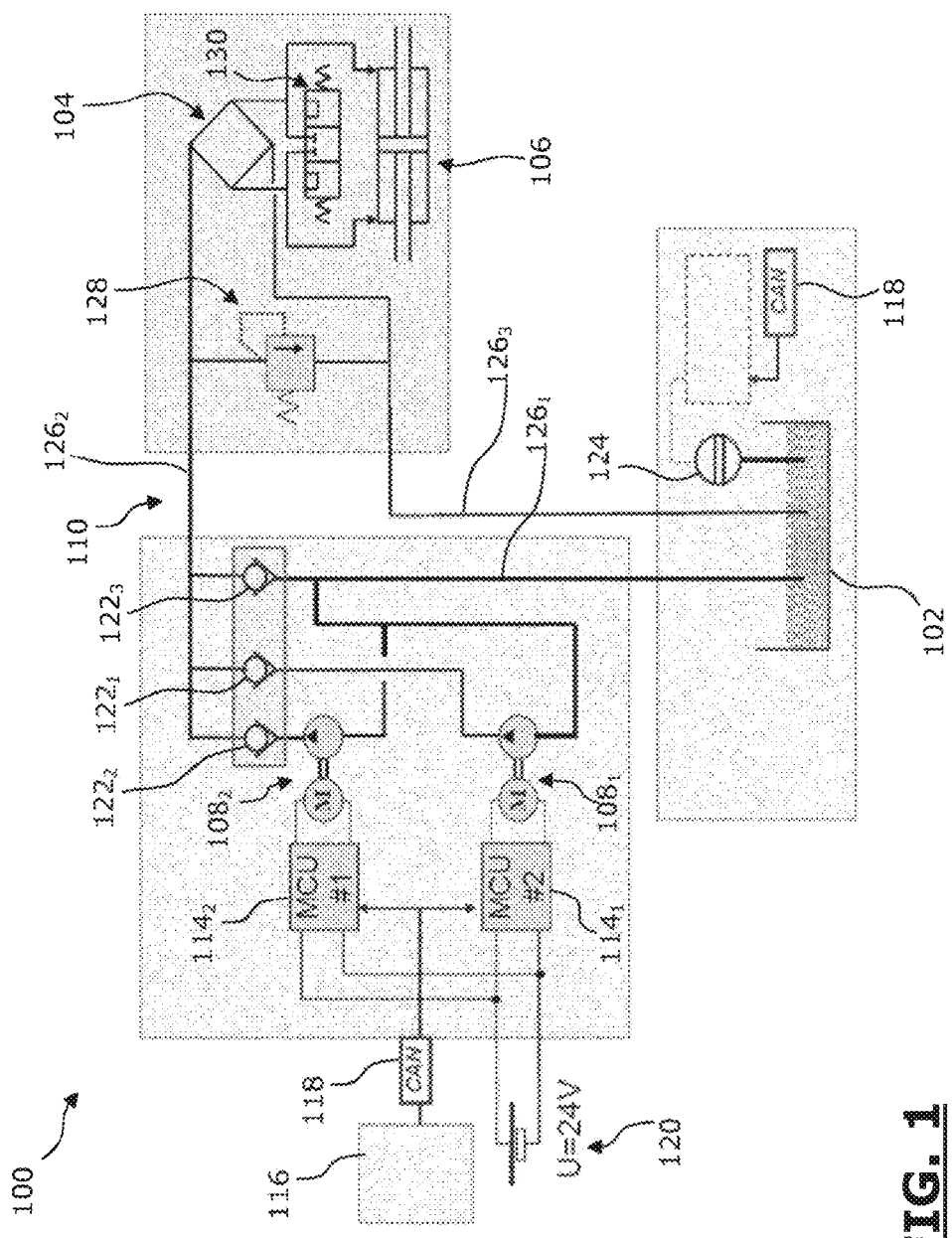
FIG. 1 is the schematic diagram of a non-limitative example of the system according to the invention.

FIG. 1 is a schematic diagram of a non-limitative example of the electro-hydraulic power-assisted steering system for an electric vehicle according to the invention.

The system 100 shown in FIG. 1 comprises a reservoir for hydraulic fluid 102, such as oil, and a hydraulic actuator 104 for operating a steering rack shaft 106 of an electric vehicle.

The system 100 shown in FIG. 1, comprises two low-voltage electric pump-motor units $108_1$ and $108_2$, for example operating at 24V, arranged in parallel with respect to a hydraulic circuit 110, between the reservoir 102 and the actuator 104. Each electric pump-motor unit $108_1$-$108_2$ makes it possible to modify and to adjust the flow rate of the hydraulic fluid provided to the actuator 104.

A computer $114_1$ and $114_2$ respectively, is associated with each pump-motor unit $108_1$-$108_2$, making it possible to adjust the operation of the pump-motor unit $108_1$-$108_2$, depending on signals received from at least one external device 116, such as for example a main computer of the vehicle, through a communication network 118, for example of the CAN type. According to a non-limitative embodiment example, each computer $114_1$ and $114_2$ controls each electric pump-motor unit $108_1$-$108_2$ in order to adjust the flow rate of the hydraulic fluid, depending on at least one of the following parameters:
  a speed of turning of the steering wheel of the vehicle,
  a speed of the vehicle, and/or
  a weight of said vehicle;
considered individually, or in combination, in a relationship previously stored in the computer $114_1$-$114_2$.

More precisely, each computer $114_1$ and $114_2$ controls the rotational speed of each electric pump-motor unit $108_1$-$108_2$ so as to increase, or decrease respectively, the rotational speed of said motor when the value of at least one of the parameters increases or decreases respectively.

This or these parameters are provided by the main computer 116. Alternatively, at least one of these parameters can be provided to each computer 114 by a device dedicated to measuring this parameter, such as for example an odometer for the speed, an angle sensor for the angle of rotation of the vehicle and a weight indicator for the weight or equivalent.

The system 100 can also comprise a battery 120 delivering a 24V signal, supplying the different components of the system 100, and in particular each pump-motor unit 108 and each computer 114.

Each pump-motor unit $108_1$ and $108_2$ is connected to the hydraulic circuit 110 via a non-return valve, $122_1$ and $122_2$ respectively, placed between said pump-motor unit and the hydraulic actuator 104.

The reservoir 102 is also connected to the hydraulic actuator 104 via a third non-return valve $122_3$.

The hydraulic fluid reservoir 102 is fitted with a sensor 124 for measuring the level of hydraulic fluid in the reservoir 102. The values measured by this sensor 124 are transmitted to another device, such as the main computer 116, through the communication network 118.

The hydraulic circuit 110 contains an upstream part $126_1$ located between the reservoir 102 and the pump-motor units 108, a downstream part $126_2$ located between the pump-motor units 108 and the actuator 104, and a return part $126_3$ located between the actuator 104 and the reservoir 102. The hydraulic fluid travels through the hydraulic circuit 110 from the reservoir 102 to the actuator 104 in the upstream $126_1$ and downstream $126_2$ parts, and from the actuator 104 to the reservoir 102 in the return part $126_3$.

The branch $126_1$ associated with the anti-return valve $122_3$, which is not associated with any pump-motor unit, allows the hydraulic fluid to flow even when the pump-motor units $108_1$ and $108_2$ have failed, and therefore to retain power-assisted steering, which is then purely mechanical.

The system 100 also comprises, near the hydraulic actuator 104, a safety valve 128 for releasing the pressure present in the upstream part $126_2$ of the hydraulic circuit.

In addition, a short-circuiter 130, also called a by-pass, allows the hydraulic fluid to pass directly from the actuator 104 to the return part $126_3$ of the hydraulic circuit 110 without being provided to the shaft 106, when the steering is at the end position in one direction or the other.

Figure 2:
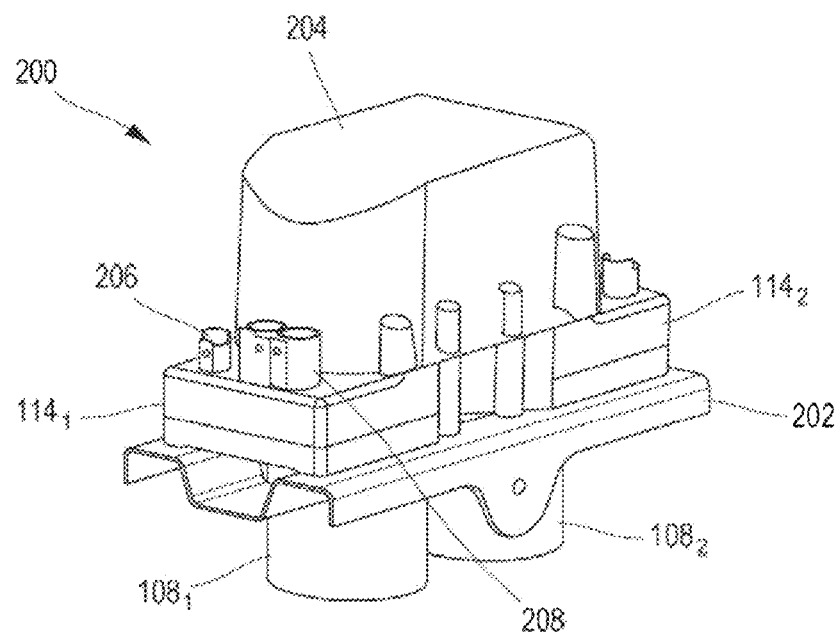
FIG. 2 is a diagrammatic representation of a unit comprising different elements of the system in FIG. 1.

FIG. 2 is a diagrammatic representation of a unit comprising different elements that can be used in a system according to the invention, such as for example the system 100 in FIG. 1.

More particularly, FIG. 2 is a diagrammatic representation in an isometric view of a unit 200 comprising the pump-motor units $108_1$ and $108_2$ and the computers $114_1$ and $114_2$.

The set of these elements forms a unit 200 due to a support 202. A cover 204 is placed on the upper part of the pump-motor units $108_1$ and $108_2$.

Each computer $114_1$ and $114_2$ comprises a connection interface 206 to the communication network 118 and a power connector 208 for receiving the 24V electrical supply signal provided by the battery 120.

Such a unit 200 is compact and has a small space requirement. Thus, it can be easily incorporated into a vehicle according to the invention. Moreover, such a unit can be easily handled by an operator, the latter not needing to handle the pump-motor units $108_1$ and $108_2$ and the computers $114_1$ and $114_2$ individually.

Figure 3:
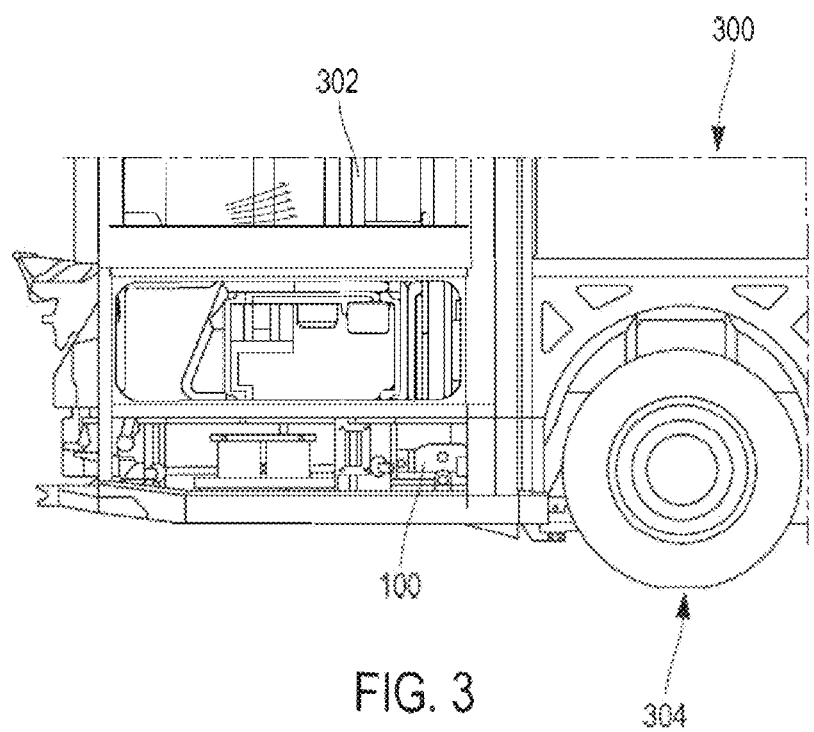
FIG. 3 is a partial diagrammatic representation of a vehicle according to the invention.

FIG. 3 is a partial diagrammatic representation of a vehicle according to the invention.

The vehicle 300 shown in FIG. 3 is an electric bus comprising rechargeable electrical storage modules (not shown), each module being able to comprise one or more batteries or one or more supercapacitors.

The vehicle 300 can comprise an electro-hydraulic power-assisted steering system, such as for example the system 100 in FIG. 1.

The system 100 is arranged in the vehicle in the front part of the vehicle 300, for example beneath a driver's position 302 of the vehicle 300, and/or in immediate proximity to a front steered axle 304 of the vehicle 300.

Of course, the invention is not limited to the examples detailed above. For example, the invention is not limited to buses and can for example be applied to buses, tyred trams and to other on-road heavy public transport land vehicles of the bus type.

In addition, the supply signal can be provided by a power converter without the use of a battery.

Furthermore, the number of pump-motor units, and therefore of computers, can be greater than 1. In other words, the system according to the invention can comprise one or more pump-motor units.

Moreover, a single computer can be used for at least two pump-motor units.

The invention claimed is:

1. A heavy electric vehicle equipped with an electro-hydraulic power-assisted steering system, comprising:
   at least one hydraulic fluid reservoir;
   at least one hydraulic actuator for operating a steering rack shaft of said vehicle;
   at least two electric pump-motors arranged in parallel in order to supply said at least one hydraulic actuator with hydraulic fluid from said hydraulic fluid reservoir and adjust the flow rate of hydraulic fluid provided to said at least one hydraulic actuator; and
   each electric pump-motor is a pump-motor operating at a voltage of 24V;
   wherein the electro-hydraulic power-assisted steering system is positioned in a front part, in particular close to a front axle of said vehicle, and even more particularly beneath a driver's position of said vehicle.

2. The system according to claim 1, characterized in that at least one electric pump-motor is controlled in order to adjust its rotational speed, depending on at least one of the following parameters:
   a speed of turning of a steering wheel of said vehicle,
   a speed of said vehicle, and
   a weight of said vehicle,
the value(s) of which is(are) measured or provided by another device with which the vehicle is equipped.

3. The system according to claim 2, characterized in that at least one electric pump-motor is controlled in order to increase, or reduce its rotational speed respectively, when the value of at least one parameter increases, or reduces respectively.

4. The system according to claim 1, characterized in that it also comprises a computer for controlling each electric pump-motor, depending on at least one parameter relating to the vehicle.

5. The system according to claim 4, characterized in that it comprises an individual computer for each electric pump-motor.

6. The system according to claim 4, characterized in that at least one computer comprises a communication interface allowing it to receive at least one signal from a device external to said system.

7. The system according to claim 6, characterized in that the external device is a main computer of the vehicle.

8. The system according to claim 4, characterized in that at least one computer is configured to control each electric pump-motor, depending on at least one of the following parameters:
   a speed of turning of a steering wheel of the vehicle,
   a speed of the vehicle, and/or
   a weight of the vehicle;
the value(s) of which is(are) measured or provided by another device with which the vehicle is equipped.

9. The system according to claim 1, characterized in that it also comprises a low-voltage battery in order to supply each electric pump-motor.

10. The vehicle according to claim 1, characterized in that it comprises:
    at least one rechargeable electrical energy storage module, delivering a high voltage electrical signal; and
    a power converter for providing a low-voltage electrical signal from said high voltage signal, in particular 24V, in order to supply the electro-hydraulic power-assisted steering system.

11. The vehicle according to claim 1, characterized in that it is a bus, a coach or an electric tyred tram.

* * * * *